United States Patent
Yi et al.

(10) Patent No.: US 9,681,403 B2
(45) Date of Patent: Jun. 13, 2017

(54) METHOD AND APPARATUS FOR MANAGING UPLINK TIME ALIGNMENT

(75) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 13/979,339

(22) PCT Filed: Mar. 8, 2012

(86) PCT No.: PCT/KR2012/001679
§ 371 (c)(1),
(2), (4) Date: Jul. 11, 2013

(87) PCT Pub. No.: WO2012/134071
PCT Pub. Date: Oct. 4, 2012

(65) Prior Publication Data
US 2013/0294424 A1    Nov. 7, 2013

Related U.S. Application Data

(60) Provisional application No. 61/469,072, filed on Mar. 29, 2011.

(30) Foreign Application Priority Data

Feb. 6, 2012    (KR) .................. 10-2012-0011721

(51) Int. Cl.
*H04W 56/00* (2009.01)
*H04W 74/00* (2009.01)
(Continued)

(52) U.S. Cl.
CPC ....... *H04W 56/00* (2013.01); *H04W 56/0005* (2013.01); *H04W 56/0045* (2013.01);
(Continued)

(58) Field of Classification Search
CPC . H04W 72/0446; H04W 84/12; H04W 84/18; H04W 28/04; H04W 28/06
(Continued)

(56) References Cited

U.S. PATENT DOCUMENTS 8,274,969 B2 *  9/2012  Wu ............................... 370/354
9,439,158 B2 *  9/2016  Loehr ................. H04W 52/365
(Continued)

FOREIGN PATENT DOCUMENTS

KR    10-2009-0052822 A    5/2009
KR    10-2009-0098421 A    9/2009
(Continued)

OTHER PUBLICATIONS

InterDigital Communications, "Release of PUCCH resources and removal of SCELL Configuration", 3GPP TSG-RAN WG2 #71, Aug. 23-27, 2010, R2-104814, 11 pages.
(Continued)

*Primary Examiner* — Maharishi Khirodhar
*Assistant Examiner* — Sanjay K Dewan
(74) *Attorney, Agent, or Firm* — Birch, Stewart, Kolasch & Birch, LLP (57) ABSTRACT

A method and apparatus of managing uplink time alignment in a wireless communication system is provided. A user equipment starts a time alignment timer which is used to control how long the user equipment is considered uplink time aligned and receives an expiry request message from a base station while the time alignment timer is running. Upon
(Continued)

receiving the expiry request, the user equipment expires the time alignment timer and releasing uplink resources.

6 Claims, 4 Drawing Sheets

(51) Int. Cl.
H04W 74/08 (2009.01)
H04W 92/10 (2009.01)

(52) U.S. Cl.
CPC ........ *H04W 74/004* (2013.01); *H04W 74/006* (2013.01); *H04W 74/0833* (2013.01); *H04W 92/10* (2013.01)

(58) Field of Classification Search
USPC ........................................... 370/336
See application file for complete search history.

(56) References Cited

U.S. PATENT DOCUMENTS

| | | | |
|---|---|---|---|
| 2004/0052266 A1* | 3/2004 | Meyer ................. | H04Q 11/0478 370/412 |
| 2008/0317017 A1* | 12/2008 | Wiemann ............. | H04L 1/0002 370/389 |
| 2009/0213815 A1* | 8/2009 | Sherman ........... | H04W 74/0841 370/336 |
| 2009/0279495 A1 | 11/2009 | Yoo | |
| 2010/0054214 A1* | 3/2010 | Igarashi ............ | H04W 52/0216 370/336 |
| 2010/0070814 A1* | 3/2010 | Damnjanovic ......... | H04L 1/188 714/748 |
| 2010/0105334 A1* | 4/2010 | Terry .................... | H04L 1/1607 455/67.11 |
| 2010/0177747 A1* | 7/2010 | Chun et al. ................... | 370/336 |
| 2010/0195640 A1* | 8/2010 | Park et al. .................... | 370/350 |
| 2010/0202380 A1* | 8/2010 | Park .................. | H04W 72/0406 370/329 |
| 2010/0208651 A1* | 8/2010 | Ramos Peres ........ | H04L 1/1841 370/328 |
| 2010/0284376 A1* | 11/2010 | Park .................. | H04W 56/0045 370/336 |
| 2010/0298001 A1* | 11/2010 | Dimou ................ | H04W 64/006 455/441 |
| 2011/0038361 A1 | 2/2011 | Park et al. | |
| 2011/0319065 A1* | 12/2011 | Dalsgaard ............. | H04L 1/0027 455/418 |
| 2012/0008600 A1* | 1/2012 | Marinier ................. | H04L 5/001 370/336 |
| 2012/0063425 A1* | 3/2012 | Wang ................ | H04W 56/0045 370/336 |
| 2012/0176910 A1* | 7/2012 | Cui ....................... | H04W 24/10 370/241 |
| 2012/0178494 A1* | 7/2012 | Haim .................. | H04W 52/365 455/522 |
| 2012/0257601 A1* | 10/2012 | Kim ....................... | H04L 5/001 370/336 |
| 2013/0028198 A1* | 1/2013 | Yamada ............ | H04W 56/0005 370/329 |
| 2013/0034014 A1* | 2/2013 | Jonsson ................ | H04W 24/10 370/253 |
| 2013/0083675 A1* | 4/2013 | Yamada ........................ | 370/252 |
| 2013/0100938 A1* | 4/2013 | Kwon ............... | H04W 56/0045 370/336 |
| 2013/0114574 A1* | 5/2013 | Ng ..................... | H04W 56/0045 370/336 |
| 2013/0114576 A1* | 5/2013 | Kwon et al. .................... | 370/336 |
| 2013/0121315 A1* | 5/2013 | Langereis .......... | H04W 56/0045 370/336 |
| 2013/0163535 A1* | 6/2013 | Anderson ............. | H04W 72/04 370/329 |
| 2013/0188612 A1* | 7/2013 | Dinan ........................... | 370/336 |
| 2013/0258959 A1* | 10/2013 | Dinan ........................... | 370/329 |
| 2013/0259008 A1* | 10/2013 | Dinan .................. | H04W 56/001 370/336 |
| 2014/0036808 A1* | 2/2014 | Pelletier et al. .............. | 370/329 |
| 2014/0044050 A1* | 2/2014 | Lu ..................... | H04W 56/0045 370/328 |
| 2014/0086219 A1* | 3/2014 | Suzuki .............. | H04W 56/0005 370/336 |
| 2014/0112172 A1* | 4/2014 | Vangala ................ | H04W 24/06 370/252 |
| 2014/0161111 A1* | 6/2014 | Kim et al. ...................... | 370/336 |
| 2014/0177464 A1* | 6/2014 | Kanamarlapudi .... | H04L 1/0002 370/252 |
| 2014/0355504 A1* | 12/2014 | Du et al. ........................ | 370/311 |
| 2014/0369325 A1* | 12/2014 | Bergstrom et al. ........... | 370/336 |
| 2015/0124787 A1* | 5/2015 | Dinan .................. | H04W 56/00 370/336 |
| 2015/0237576 A1* | 8/2015 | Lee .................... | H04W 52/0209 370/311 |
| 2016/0066284 A1* | 3/2016 | Kwon ................. | H04W 52/365 370/329 |
| 2016/0066328 A1* | 3/2016 | Hu ..................... | H04W 72/1284 370/329 |
| 2016/0127939 A1* | 5/2016 | Bathwal ................ | H04L 1/1854 370/252 |
| 2016/0174160 A1* | 6/2016 | Shen .................. | H04W 52/146 455/522 |

FOREIGN PATENT DOCUMENTS

KR 10-2009-0116590 A 11/2009
WO WO 2007/045505 A1 4/2007

OTHER PUBLICATIONS

NTT DoCoMo, Inc., "RRC_CONNECTED DRX and dedicated UL resource release", 3GPP TSG RAN WG2 #61, Feb. 11-15, 2008, R2-081157, 4 pages.

\* cited by examiner

METHOD AND APPARATUS FOR MANAGING UPLINK TIME ALIGNMENT

CROSS REFERENCE TO RELATED APPLICATIONS

This application is the National Phase of PCT/KR2012/001679 filed on Mar. 8, 2012, which claims priority under 35 U.S.C. 119(e) to U.S. Provisional Application No. 61/469,072 filed on Mar. 29, 2011 and under 35 U.S.C. 119(a) to Patent Application No. 10-2012-0011721 filed in the Republic of Korea on Feb. 6, 2012, all of which are hereby expressly incorporated by reference into the present application.

TECHNICAL FIELD

The present invention relates to wireless communications, and more particularly, to a method and apparatus for managing uplink time alignment in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

An LTE system based on an orthogonal frequency division multiplexing (OFDM) technique has a possibility that an interference to another user occurs in a process of performing communication between a user equipment (UE) and a base station (BS). In order to minimize the interference, it is very important for the BS to manage uplink transmission timing of the UE. Therefore, the BS properly regulates the uplink transmission timing of the UE according to a situation of the UE, and such a regulation is called management of uplink time alignment.

Since the UE does not always exist in a fixed location, the transmission timing of the UE varies depending on a speed and location of the moving UE. By considering this, the UE assumes that the uplink time alignment is valid only during a specific time period even if the uplink time alignment is set. A timer used for this is a time alignment timer (TAT).

The TAT is used to control how long the UE maintains the uplink time alignment.

The UE uses various applications. One application may need to always maintain the uplink alignment, whereas another application may no longer need to maintain the uplink alignment due to temporary uplink transmission.

Although the application used by the UE has various features, whether to maintain an uplink synchronized state of the UE is determined entirely by the BS in the LTE system.

There is a need to determine whether to maintain the uplink time alignment according to the situation of the UE.

DISCLOSURE OF INVENTION

Technical Problem

The present invention provides a method and apparatus for managing uplink time alignment in a wireless communication system.

Solution to Problem

In an aspect, a method of managing uplink time alignment in a wireless communication system is provided. The method includes starting a time alignment timer which is used to control how long the user equipment is considered uplink time aligned, receiving an expiry request message from a base station while the time alignment timer is running, and upon receiving the expiry request, expiring the time alignment timer and releasing uplink resources.

The expiry request message may include expiry information indicating when the time alignment timer is expired.

The method may further include transmitting a request message for requesting the expiry of uplink time alignment to the base station.

In another aspect, a user equipment for managing uplink time alignment in a wireless communication system is provided. The user equipment includes a radio frequency unit for receiving a radio signal, and a processor, operatively coupled with the radio frequency unit, configured to start a time alignment timer which is used to control how long the user equipment is considered uplink time aligned, receive an expiry request message from a base station while the time alignment timer is running, and upon receiving the expiry request, expire the time alignment timer and release uplink resources.

In still another aspect, a user equipment for managing uplink time alignment in a wireless communication system is provided. The user equipment includes a radio frequency unit configured to receive and transmit a radio signal, and a processor, operatively coupled with the radio frequency unit, configured to start a time alignment timer which is used to control how long the user equipment is considered uplink time aligned, and transmit a request message for requesting an extension or an expiry of uplink time alignment to a base station while the time alignment timer is running.

Advantageous Effects of Invention

An uplink synchronized state can be properly maintained according to a situation of an application used by a user equipment. An access time delay can be avoided, and battery consumption of the user equipment can be reduced. Network radio resource allocation can be optimized.

MODE FOR THE INVENTION

Figure 1:
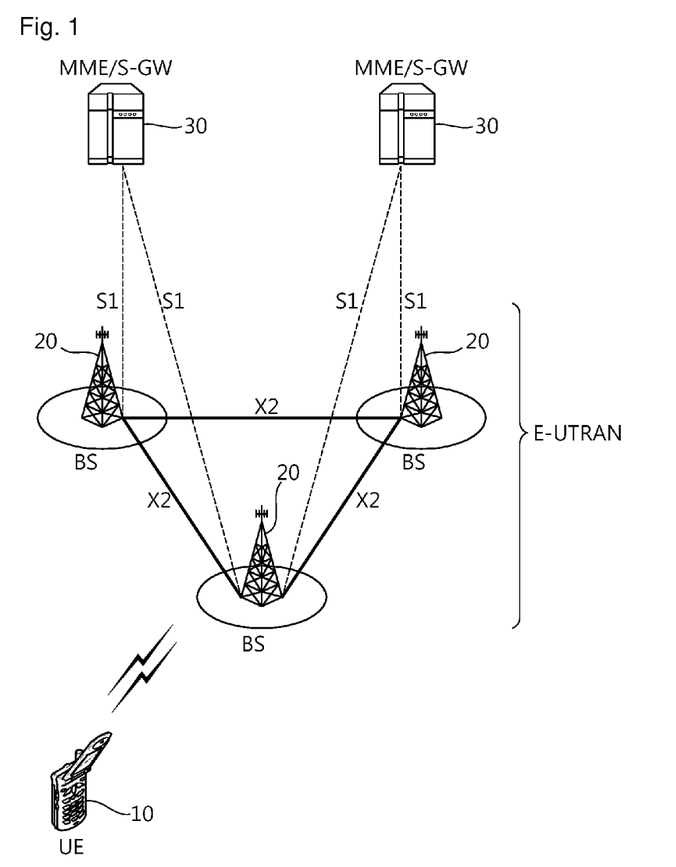
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
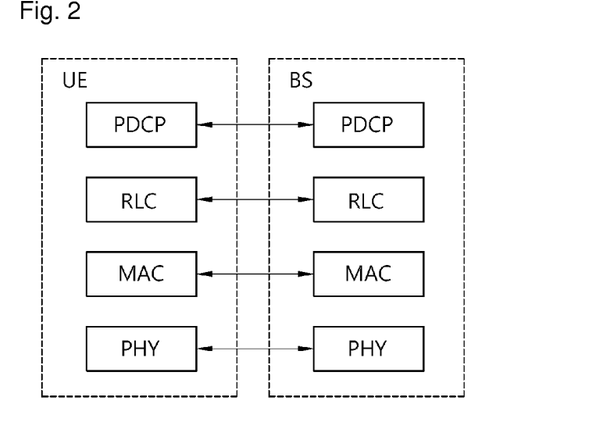
FIG. 2 is a diagram showing a radio protocol architecture for a user plane.
Figure 3:
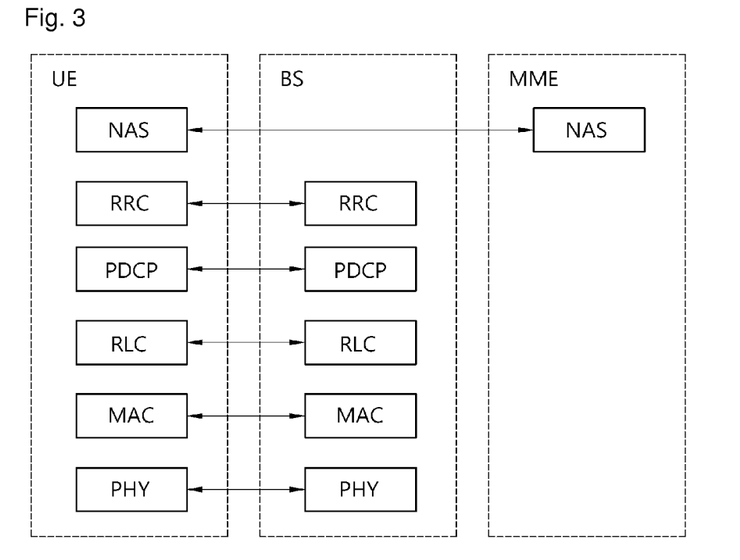
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Now, uplink timing synchronization will be described.

An LTE system based on an orthogonal frequency division multiplexing (OFDM) technique has a possibility that an interference to another user occurs in a process of performing communication between a UE and a BS. In order to minimize the interference, it is very important for the BS to manage uplink transmission timing of the UE.

The UE can be located in any region within a cell. This implies that an arrival time of uplink data delivered to the BS may differ depending on a location of each UE. For example, an arrival time of the data of a UE located in a cell boundary may be longer than an arrival time of uplink data of a UE located in a cell center.

In order for the BS to decrease interference between UEs, the BS needs to be able to receive uplink data transmitted by all UEs in a cell in a specific time domain. Therefore, the BS properly regulates the uplink transmission timing of the UE according to a situation of the UE, and such a regulation is called management of uplink time alignment.

A random access process is one method of managing time alignment. When the BS receives a random access preamble, a timing alignment value for advancing or delaying transmission timing of the UE is calculated by using reception information of the random access preamble. The timing alignment value is called a timing advance command (hereinafter, TAC). The BS transmits the timing alignment value to the UE through a random access response. The UE updates transmission timing by applying the timing alignment value.

In another method, the BS receives a sounding reference signal (SRS) transmitted periodically or randomly, and calculates the TAC by using the SRS and then reports it to the UE through a MAC control element (CE). Accordingly, the UE updates its transmission timing.

Figure 4:
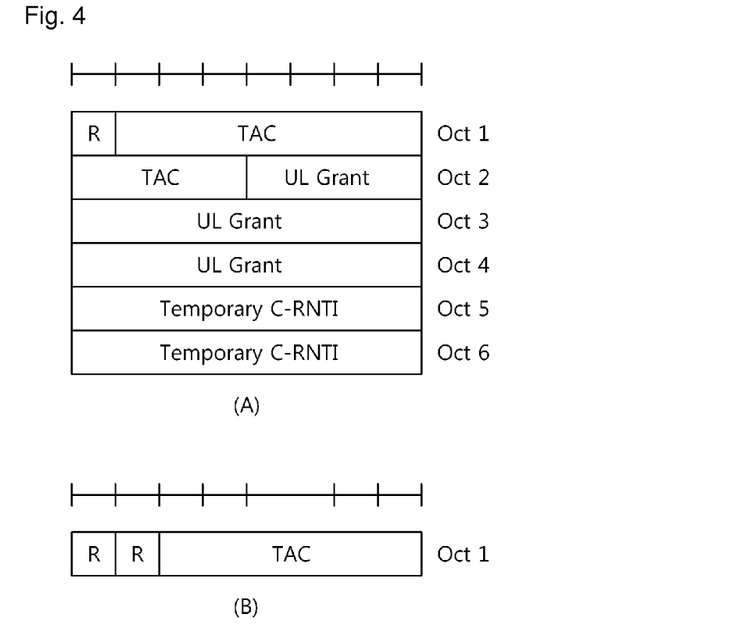
FIG. 4 shows an example of transmitting a timing advance command (TAC).

FIG. 4 shows an example of transmitting a TAC. The section 6 of 3GPP (3rd Generation Partnership Project) TS (Technical Specification) 36.321 V8.5.0 (2009 March) can be incorporated herein by reference. FIG. 4(A) shows a TAC included in a random access response. FIG. 4(B) shows a TAC included in a MAC CE.

When the TAC is included in the random access response, this is case where new alignment is performed in a state where a UE is not time-aligned. Therefore, a precise regulation is required, and an 11-bit TAC is transmitted. When the TAC is included in the MAC CE, this is a case where it is used to extend time alignment in a situation where the UE is time-aligned, and thus a 6-bit TAC is transmitted.

However, since the UE does not always exist in a fixed location, transmission timing of the UE varies depending on a speed and location of the moving UE. By considering this, the UE assumes that time alignment is valid only during a specific time after receiving the TAC from a BS. A timer used for this is a time alignment timer (TAT).

The TAT is used to control how long the UE maintains the uplink time alignment.

Upon receiving the TAC from the BS, the UE applies the TAC and thereafter starts or restarts the TAT. The UE assumes that uplink time alignment with the BS is established only during the TAT is running.

A value of the TAT can be delivered by the BS to the UE through an RRC message such as system information or radio bearer reconfiguration.

If the UE receives a new TAC from the BS while the TAT is running, the UE can correct its uplink alignment timing by the TAC, and can restart the TAT. In addition, when the TAT expires or does not operate, the UE assumes that uplink time alignment is not established with the BS, and does not transmission any uplink data or control information (e.g., PUSCH and PUCCH) other than a random access preamble.

The UE uses various applications. One application may need to always maintain the uplink alignment, whereas another application may not need to always maintain the uplink alignment due to temporary uplink transmission.

Although the application used by the UE has various features, whether to maintain an uplink synchronized state of the UE is determined entirely by the BS in the conventional technique.

If the application needs to always maintain uplink alignment, the UE has to always maintain the uplink synchronized state. However, since the BS sets the TAT value of the UE in the conventional technique, if an inactivity period of the UE is longer than the set TAT value, the TAT expires during the inactivity period and thus the UE changes to an uplink timing unsynchronized state.

The uplink timing unsynchronized state refers to a state in which the TAT does not operate, and the uplink timing synchronized state refers to a state in which the TAT operates.

In order for the UE to change from the uplink unsynchronized state to the uplink synchronized state, a random access procedure restarts, and a radio resource for an uplink control channel (e.g., PUCCH and sounding reference signal (SRS)) must be reconfigured. Therefore, there is a problem in that a delay for uplink data transmission increases.

On the contrary, assume that there is an application which performs uplink transmission only once and which is allowed to change to the uplink unsynchronized state immediately without having to wait until the expiry of the TAT. According to the conventional technique, the UE changes to the uplink unsynchronized state after the expiry of the TAT. This causes a problem in that battery of the UE is consumed to maintain unnecessary uplink synchronization and in that the UE maintains unnecessary radio resource allocation. This is because, while the UE maintains the synchronized state, the UE periodically transmits an SRS to the BS, and the BS pre-allocates a radio resource for SRS and PUCCH transmission.

As the UE simultaneously uses various applications, there is a need to further change the uplink synchronized state according to a UE situation.

The present invention proposes a method for maintaining the uplink synchronized state according to the UE situation by allowing the UE to be able to transmit to the BS a request for an extension or expiry of the uplink synchronized state.

The UE transmits a TAC request message for maintaining uplink alignment to the BS. Upon receiving the TAC request message, the BS can extend the synchronized state of the UE according to the content of the message or can change the synchronized state of the UE to the unsynchronized state.

Figure 5:
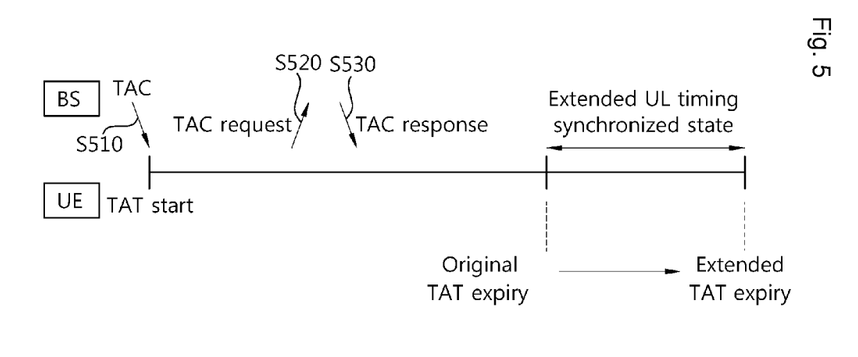
FIG. 5 shows a method of managing uplink time alignment according to an embodiment of the present invention.

FIG. 5 shows a method of managing uplink time alignment according to an embodiment of the present invention.

Upon receiving a TAC, a UE applies the TAC and starts a TAT (step S510). The starting of the TAT may include restarting of the TAT.

The UE determines an extension or expiry of uplink time alignment according to an application type.

The UE sends a TAC request message to the BS while the TAT is running (step S520). The TAC request message is used to request the extension or expiry of the uplink time alignment to the BS. The TAC request message is used to request the extension or expiry of an uplink synchronized state to the BS.

The UE can randomly transmit the TAC request message to the BS. Alternatively, the UE can transmit the TAC request message to the BS during a determined period. For example, the UE cannot transmit the TAC request message to the BS while a prohibition timer is running. The BS can determine a prohibition timer value, and can report the prohibition timer value to the UE. Alternatively, the prohibition timer value can be pre-defined. The prohibition timer can be utilized to provide a time for scheduling a radio resource by the BS according to a TAC request.

The TAC request message can be transmitted as a MAC CE or an RRC message. When the TAC request is transmitted as the MAC CE, a logical channel identity (LCID) for the TAC request can be allocated.

The TAC request message may include request information indicating a period in which the UE desires to operate the TAT.

More specifically, the TAC request message may include at least one of the following items.

(1) A type of an application that needs an extension or expiry of the uplink synchronized state.

(2) A required extension time or reduced time of the uplink synchronized state.

(3) A suggested value of the TAT.

The BS transmits a TAC response message to the UE in response to the TAC request (step S530). Upon receiving the TAC request, the BS determines an extension or expiry of the uplink synchronized state on the basis information included in the TAC response message.

If it is determined to extend the uplink synchronized state, the BS instructs to restart the TAT through a TAC response. Alternatively, the BS may not send any response message.

When a new value of the TAT is proposed through the TAC request message of the UE, the BS can report a changed TAT to the UE.

Upon receiving the TAC response from the BS, the UE can restart the TAT.

Upon receiving the TAC response from the BS, the UE can extend (or reduce) an operation of the TAT by an extended time (or reduced time) included in the TAC response.

If the TAC response cannot be received during a retransmission time period, the UE can retransmit the TAC request to the BS unless the prohibition timer is running. A retransmission time and a maximum number of times of retransmitting the TAC request can be pre-defined or can be determined by the BS.

There may be a certain application which does not need to maintain the uplink synchronized state until the expiry of the TAT. The UE can request the expiry of the TAT through the TAC request. For example, if an extension time is set to 0 in the TAC request message, the BS may recognize that the UE requests to enter an uplink unsynchronized state.

When the UE requests the expiry of the TAT, the BS can transmit a TAC response message indicating a TAC expiry request. Upon receiving the TAC expiry request, the UE can make the TAT expire immediately, and can release an allocated uplink resource.

The TAC response message may include expiry information indicating when the TAT is expired by the UE. If the expiry information is set to 0, the UE can make the TAT expire immediately. Alternatively, the UE can make the TAT expire at a time indicated by the expiry information.

The TAC response message can be transmitted as a MAC CE or an RRC message. When the TAC request is transmitted as the MAC CE, an LCID for the TAC response can be allocated.

Figure 6:
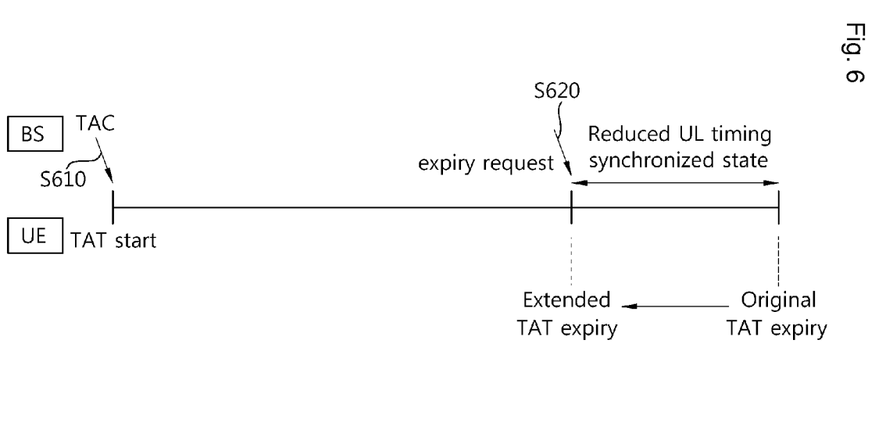
FIG. 6 shows a method of managing uplink time alignment according to another embodiment of the present invention.

FIG. 6 shows a method of managing uplink time alignment according to another embodiment of the present invention. This is a case where a BS sends a TAC expiry request without a request of a UE.

Upon receiving a TAC, the UE applies the TAC and starts a TAT (step S610).

The BS determines the expiry of the uplink time alignment, and sends an expiry request message to the UE while the TAT is running (step S620). The expiry request message may include expiry information indicating when the TAT is expired by the UE.

The UE makes the TAT either immediately or according to the expiry information included in the expiry request message, and releases au uplink resource.

The expiry request message can be received as a MAC CE or an RRC message. When a TAC request is transmitted as the MAC CE, an LCID for the expiry request can be allocated.

An uplink synchronized state can be properly maintained according to a situation of an application used by the UE. An access time delay can be avoided, and battery consumption of the UE can be reduced. Network radio resource allocation can be optimized.

Figure 7:
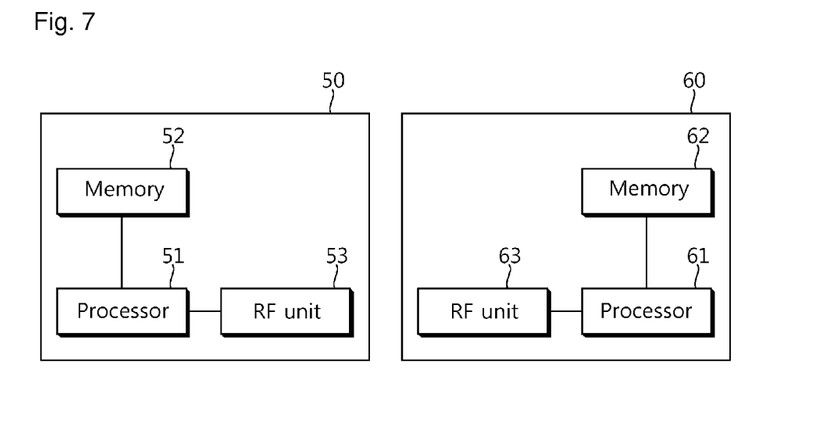
FIG. 7 is a block diagram showing a wireless communication system according to an embodiment of the present invention.

FIG. 7 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the embodiments of FIG. 5 and FIG. 6, the operation of the BS can be implemented by the processor 51.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the embodiments of FIG. 5 and FIG. 6, the operation of the BS can be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of managing uplink time alignment in a wireless communication system, performed by a user equipment (UE), the method comprising:
   receiving, by the UE from a base station, a timing advance command (TAC);
   upon receiving the TAC, starting, by the UE, a time alignment timer (TAT) and applying the received TAC,
   wherein the TAT is used to control how long the UE is considered uplink time aligned;
   transmitting, by the UE to the base station, a TAC request message that requests an extension or expiry of uplink time alignment,
   wherein the transmission of the TAC request message to the base station is prohibited during a first prohibit time period indicated by a first prohibition timer set with a prohibition timer value related to the transmission of the TAC request message,
   wherein the TAC request message includes a suggested TAC value generated by the UE, and
   wherein the TAC request message is transmitted in a form of a medium access control (MAC) control element (CE), and a new logical channel identifier (LCID) field is allocated for the MAC CE;
   transmitting, by the UE to the base station, an expiry request message that requests the expiry of uplink time alignment,
   wherein the expiry request message includes request information indicating how long the TAT will run before expiring;
   receiving, by the UE from the base station, an expiry response message in response to the expiry request message while the TAT is running; and
   upon receiving the expiry response message, stopping the TAT and releasing uplink resources,
   wherein the transmission of the expiry request message to the base station is prohibited during a second prohibit time period indicated by a second prohibition timer set with a prohibition timer value related to the transmission of the expiry request message, and
   wherein the request information included in the expiry request message indicates a type of an application that needs an extension or expiry of an uplink synchronized state.

2. The method of claim 1, wherein the expiry request message includes expiry information indicating when the TAT will expire.

3. The method of claim 1, wherein the expiry request message is received as a MAC CE or in a Radio Resource Control (RRC) message.

4. A user equipment (UE) for managing uplink time alignment in a wireless communication system, the UE comprising:
   a radio frequency (RF) unit configured to receive and transmit a radio signal; and
   a processor operatively coupled with the RF unit, and configured to:
      received, from a base station, a timing advance command (TAC),
      upon receiving the TAC, start a time alignment timer (TAT) and apply the received TAC,
      wherein the TAT is used to control how long the UE is considered uplink time aligned;
      transmit, to the base station, a TAC request message that requests an extension or expiry of uplink time alignment,
      wherein the transmission of the TAC request message to the base station is prohibited during a first prohibit time period indicated by a first prohibition timer set with a prohibition timer value related to the transmission of the TAC request message,
      wherein the TAC request message includes a suggested TAC value generated by the UE, and
      wherein the TAC request message is transmitted in a form of a medium access control (MAC) control element (CE), and a new logical channel identifier (LCID) field is allocated for the MAC CE,
      transmit, to the base station, an expiry request message that requests the expiry of uplink time alignment,
      wherein the expiry request message includes request information indicating how long the TAT will run before expiring;
      receive, from the base station, an expiry response message while the TAT is running, and
      upon receiving the expiry response message, stop the TAT and release uplink resources,
      wherein the transmission of the expiry request message to the base station is prohibited during a second prohibit time period indicated by a second prohibition timer set with a prohibition timer value related to the transmission of the expiry request message, and
      wherein the request information included in the request message indicates a type of an application that needs an extension or expiry of an uplink synchronized state.

5. The UE of claim 4, wherein the expiry request message includes expiry information indicating when the TAT will expire.

6. The UE of claim 4, wherein the expiry request message is received as a MAC CE or in a Radio Resource Control (RRC) message.

* * * * *